United States Patent [19]

Underkoffler

[11] 4,426,555
[45] Jan. 17, 1984

[54] TELEPHONE COMMUNICATIONS DEVICE FOR HEARING-IMPAIRED PERSON

[75] Inventor: Edwin C. Underkoffler, Schenectady, N.Y.

[73] Assignee: General Electric Company, Schenectady, N.Y.

[21] Appl. No.: 340,575

[22] Filed: Jan. 18, 1982

[51] Int. Cl.³ .......................................... H04M 11/00
[52] U.S. Cl. .............................. 179/84 L; 179/84 VF; 179/2 DP
[58] Field of Search ............. 179/84 L, 84 VF, 2 DP; 178/2 R, 81, 21; 340/711

[56] References Cited

U.S. PATENT DOCUMENTS 3,582,554  6/1971  LeBlang ........................ 179/2 DP
4,012,599  3/1977  Meyer .............................. 179/84 F
4,293,855  10/1981 Perkins ............................ 340/712

OTHER PUBLICATIONS

IBM Technical Disclosure Bulletin, vol. 17, No. 7, Dec. 1974, "Telephone Spoken Message Transmitter for the Deaf and Mute", pp. 2010-2012.
"Invention–Pocket Telecommunicator," *Discover*, Jan. 1982, p. 80.
Sales Brochure, "Superphone Communication Terminal," dated Nov. 4, 1981.

*Primary Examiner*—G. Z. Rubinson
*Assistant Examiner*—James L. Dwyer
*Attorney, Agent, or Firm*—Geoffrey H. Krauss; James C. Davis, Jr.; Marvin Snyder

[57] ABSTRACT

A device for visually presenting communications information, communicated over the telephone network by a pair of sequential dual-tone-matrix-frequency (DTMF) signals to a hearing-impaired person's location, includes an integrated circuit filter for separating the dual tones into one high-frequency-group tone and one low-frequency-group tones for concurrent presentation to a decoder. The decoder presents a four-bit signal to a microprocessor programmed to recognize the pair of sequentially-decoded DTMF signals as one of a set of alphanumeric symbols and to the parallel-format this character information. the character information is coupled to display drivers and associated displays, to present a plurality of sequential alphanumeric characters upon a visible display, in scrolled fashion, whereby the hearing-impaired person views visible information converted from audible tones. Only the recipient need have the communications device of the present invention, whereby a hearing-impaired recipient can receive information from any tone-encoded telephone instrument, without the requirement for the sender of information to possess special equipment.

11 Claims, 6 Drawing Figures

TELEPHONE COMMUNICATIONS DEVICE FOR HEARING-IMPAIRED PERSON

BACKGROUND OF THE INVENTION

The present invention relates to communications devices and, more particularly, to a novel communications device allowing a hearing-impaired person to receive visual information converted from audible signals transmittable over the telephone network.

Because the telephone system, which allows national and world-wide communication between individuals, normally provides for reception and output of sound energy, a hearing-impaired person has generally been prevented from communication over this network. It has long been a goal to provide some means for providing hearing-impaired individuals with access to telephone transmission of information. One previous approach to providing telephone communications for the hearing-impaired has been through use of equipment such as the typewriter-like encoder/decoder/printers manufactured by the Teletype Corporation. Because such equipment is relatively bulky, relatively expensive and transmits and receives signals of both special type, e.g. frequency-shift-keyed signals, and special coding, e.g. Baudot and the like codes, and also because an encoder/decoder/printer has been required by each of the two or more communicants, this approach has not allowed access to the telephone network by all hearing-impaired persons desirous of acquiring such access. It is therefore highly desirable to provide a device allowing communications between two locations, and providing a conversion of the normal audio signals carried over the telephone network into information of a type available to the senses of the hearing-impaired person; the communications device should be of relatively small size and portability, of relatively low cost, and should only be required for use at that end of the communications circuit at which the hearing-impaired person is situated.

BRIEF SUMMARY OF THE INVENTION

In accordance with the invention, a device for visually presenting communications information, communicated over the telephone network by a pair of sequential DTMF signals to a hearing-impaired person's location, includes: means for filtering each dual tone signal into concurrent high-frequency-group and low-frequency-group tones; a decoder for recognizing the combination of one of the high-group tones and one of the low-group tones for presenting an associated four-bit signal; a microcomputer programmed to recognize a two-key sequence of four-bit signals as one of a set of alphanumeric symbols and to then parallel format the alphanumeric character information; and means for displaying the alphanumeric information recognized by the microcomputer. Advantageously, the device includes a transducer, such as a microphone and the like, for converting the sound energy from a telephone receiver into electrical waveforms for presentation to the filter. The communications device preferably displays a plurality of characters in the sequential order of reception.

In a presently preferred embodiment, the communications device includes a "message review" capability, wherein a multiplicity of the most recently received characters stored in the device memory are scrolled across the display means to allow the user to review data greater than the display capacity and also displays special indicia when a dial tone is received to aid origination of a call by the hearing-impaired person.

Accordingly, it is an object of the present invention to provide a novel communications device for allowing a hearing-impaired person to receive information over the telephone network.

This and other objects of the present invention will become apparent upon consideration of the following detailed description when, read in conjunction with the drawings.

DETAILED DESCRIPTION OF THE INVENTION

Figure 1:
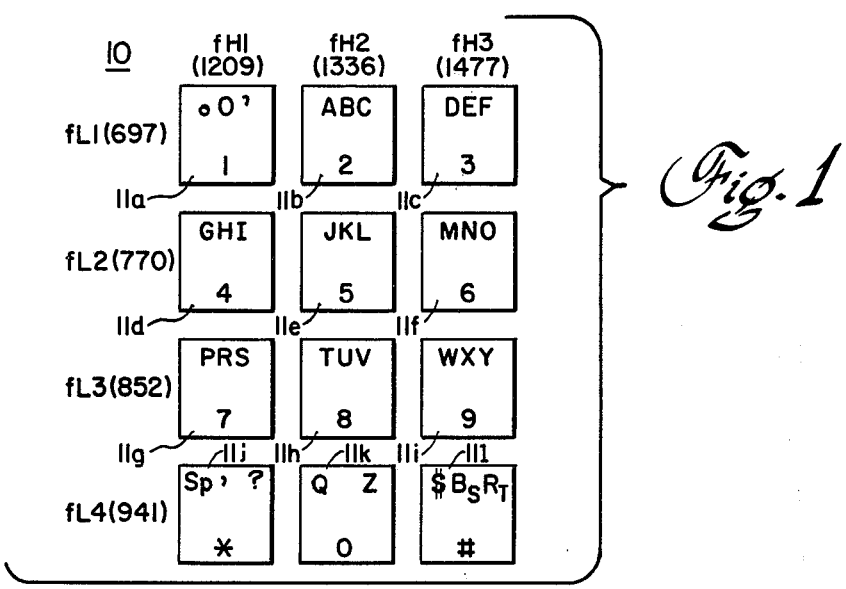
FIG. 1 is a plan view of a touch-activated telephone keyboard matrix, illustrating the DTMF frequencies and alphanumeric characters assigned thereto.

Referring initially to FIG. 1, a telephone having a dual-tone-matrix-frequency (DTMF) output is utilized as a source of alphanumeric information for transmission to a hearing-impaired recipient. Each numerical information character between 1 and 9 to be transmitted is sent as a single DTMF signal, while each alphabetic character, punctuation symbol and numeral 0 is sent as a pair of sequential DTMF signals, by sequentially pressing a pair of the keys 11 of the touch key matrix 10. The standard 12 key matrix, having numerals 1, 2 and 3 across a first row, numerals 4, 5 and 6 across a second row, numerals 7, 8 and 9 across a third row and symbol *, numeral 0 and symbol # across a bottom row, is used. While the normal keyboard matrix 10 has some of the letters of the alphabet associated with a number of the keys 11, all alphabetic symbols are not so associated, nor are symbols for punctuation, backspacing (for error correction) and the like so associated. The preferred embodiment of my novel communications device, to be described in detail hereinbelow, utilizes a coding scheme which requires the pressing of one key for each of numerals 1-9 and two sequential keys to indicate each of the other alphanumeric and punctural characters, whereby all 26 alphabetic characters, all 10 numerals and 6 punctuation symbols can be transmitted. As will be seen in FIG. 1, each of keys 11a-11l has associated therewith a plurality of symbols for transmission in addition to the numeral. Three symbols are associated with each key, except for key 11k, having only two associated symbols. The coding scheme requires that, except for numerals 1-9, the key associated with the particular symbol to be transmitted is pressed and then an associated one of the three bottom-row keys 11j, 11k or 11l is pressed to indicate whether the leftward, center or rightward symbol associated with the first key, is to be selected.

The standard lower group tones fL1-fL4 are associated with the four rows of keys, while the standard three high-frequency-group tones fH1, fH2 and fH3 are associated with the three respective key columns, as shown. The tone frequencies, in Hz., are shown in parentheses in FIG. 1 after the respective tone labels. Thus, an individual calling a hearing-impaired person will dial the number of the intended recipient, and when the recipient removes the receiver of the recipient's phone and attaches the communications device of the present invention (being alerted to an incoming call by some visual or tactile device associated with the phone ringing mechanism and forming no part of the present invention), the hearing-impaired person signals the caller to commence data transmission by two-key-press coding. The first letter of the exemplary message "HI, ED." is sent by initially pressing key 11d (whereby 770 Hz. and 1209 Hz. tones are simultaneously received at the recipient's communication device) and then pressing key 11k (whereby simultaneously 941 Hz. and 1336 Hz. tones are received) to complete the two-key-press group. This indicates that one of letters G, H or I is intended, by the first pair of DTMF tones, and that it is the center character "H" that is to be selected, responsive to the second pair of DTMF tones. Similarly, the second letter I is transmitted by first pressing key 11d and then pressing key 11l. The remainder of the message is transmitted by pressing: key 11j, followed by key 11k; key 11c, followed by key 11k; key 11c followed by key 11j; and key 11a, followed by key 11j.

Figure 2:
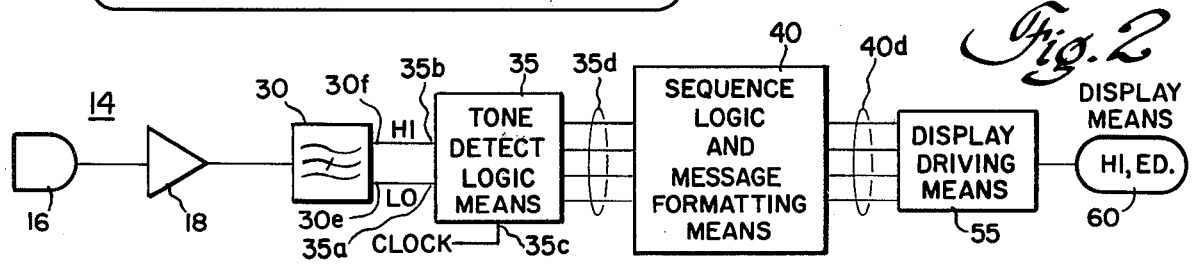
FIG. 2 is a schematic block diagram of a novel communications device in accordance with the principles of the present invention.
Figure 2A:
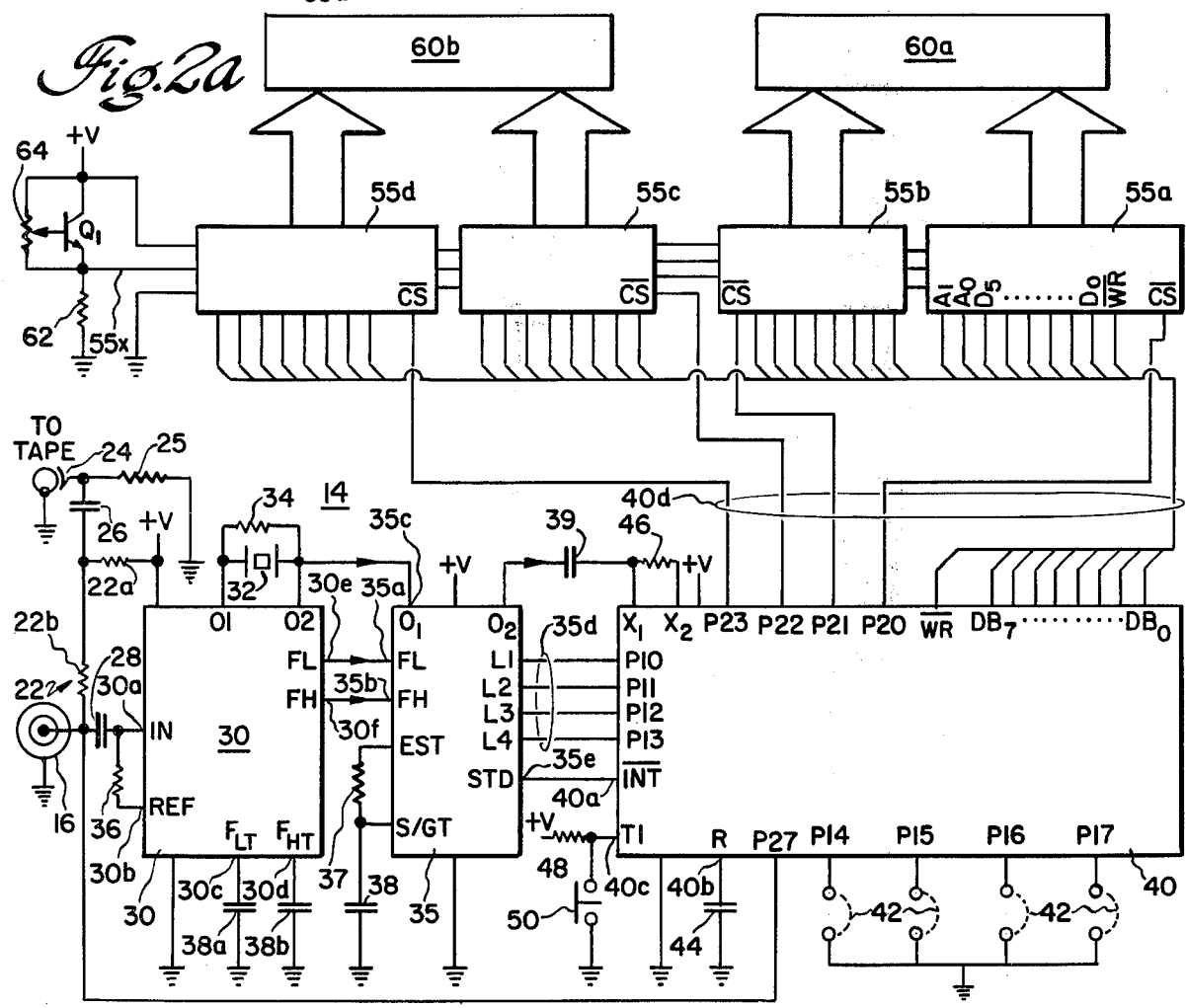
FIG. 2a is a schematic block diagram of one presently preferred embodiment of the communications device of FIG. 2.

Referring now to FIGS. 2 and 2a, one presently preferred embodiment of the communications device 14, required at the reception end for converting the received DTMF tones to visible characters, includes means 16, such as a microphone and the like, for receiving the tones from a telephone receiver and converting the audio tones into electrical waveforms. The electrical waveforms may be amplified by amplification means 18 and then processed by a band-separation filtering means 30. Filtering means 30 includes first and second outputs 30e and 30f at which the low-group and high-group tones respectively appear. In my presently preferred embodiment, microphone 16 is provided with operating potential by means of a network 22, comprised of resistors 22a and 22b, connected between a positive operating potential +V, ground potential and the microphone element 16. An output jack 24 and parallel resistor 25 are coupled, via a capacitance 26, to network 22, whereby the electrical received-tone waveforms may be routed to a tape recorder for storage; the ability to subsequently replay the received message tone sequences provides not only a message recall function, but can provide operation with a telephone answering machine and the like apparatus. The microphone is coupled through another capacitance 28 to the input 30a of a DTMF amplifier-filtering means 30, providing the functions of elements 18 and 30 of FIG. 2. Means 30, which may be an MT8865 integrated circuit (available from MITEL Semiconductor) and the like, utilizes an oscillator controlled by a crystal element 32 (typically at the standard 3.58 MHz. TV color burst frequency) and a shunting resistance element 34, both connected between first and second oscillator terminals O1 and O2 thereof. Another resistance element 36 is connected between input terminal 30a and a reference terminal 30b. High and low group filtering capacitance elements 38a and 38b, respectively, are connected to appropriate $F_{LT}$ and $F_{HT}$ terminals 30c and 30d, as required by the particular integrated circuit utilized. The filtered low and high group tones appear at respective low group FL and high group FH outputs 30e an 30f respectively.

The frequency-filtered low and high tones are applied to respective inputs 35a and 35b of a tone detect logic means 35, also having a clock signal applied to a clock input 35c thereof. Tone detect logic means 35 decodes the low and high group tones into that one of 12 DTMF combinations then being received. The detected combination is indicated by the logic states of the signals on four output bit lines 35d. Advantageously, means 35 is provided by an integrated circuit such as the type MT8860 DTMF decoder integrated circuit also available from MITEL. Use of the MITEL integrated circuits is particular advantageous, in that both require the same oscillator frequency, whereby the crystal oscillator waveform from integrated circuit 30 is supplied to the O1 input of integrated circuit 35 and only a single crystal is required for operation of the filter-decoder circuit pair. Further, the crystal-controlled oscillator waveform is also available at the second oscillator O2 terminal of integrated circuit 35, and is coupled therefrom by a capacitance 39, for use in a microprocessor integrated circuit (to be described hereinbelow), whereby the entire communications device 14 requires only a single crystal 32 for operation. As required by the particular DTMF decoder 35 utilized, a resistance element 37 is coupled between an EST terminal and S/GT steering logic terminals, with the later terminals having a capacitive element 38 coupled to ground potential therefrom. This provides a delay to enhance noise rejection of unwanted signals and to accommodate brief dropouts of established tones. The 4-bit one-of-16 decoded tone-pair output bits appear at output lines L1-L4, simultaneously with a strobe STD output. It will be appreciated that a full 16-key matrix (using a 4×4 key matrix) can be utilized equally as well as the illustrated 12-key matrix, with a fourth high-group tone fH4 being utilized in a fourth (right-hand-most) column; such 16-key matrices are well known to the art. Of course, use of a 16-key matrix would normally require either reassignment of all alphanumeric characters, or assignment of additional indicia to the additional keys. Use of a 16-key matrix also renders possible the assignment of four indicia to each key of the matrix, with the proper one of the four indicia assigned to any particular key being effected by a second-key-press upon one of the four keys of the lower-most row.

The 4-bit output 35d of the tone detect logic means is coupled to 4 input bit lines P10-P13 of a parallel input port of a single-chip microprocessor 40, utilized as a sequence logic and message formating means. In the illustrated embodiment, means 40 is provided by an 8748 microprocessor, available from INTEL Corporation and the like. Utilizing the 8748 microprocessor for sequence logic and message formating means 40, the valid tone STD output 35e of the decoder means 35 is connected to an interrupt $\overline{INT}$ input 40a of the microprocessor. The microprocessor will be utilized as a timer-generated-interrupt-driven sequence/format machine. An 8-bit parallel data bus output, including data bus lines $DB_0$-$DB_7$, and the read/write $\overline{WR}$ output are bussed together from microcomputer 40 to the data $D_0$-$D_5$, address $A_0$ and $A_1$ and read/write $\overline{WR}$ inputs of each of four display driving means 55a-55d, in parallel. A second parallel input/output port has the first four lines P20-P23 thereof individually connected to the chip select $\overline{CS}$ inputs of display driving means 55a-55d to provide selective writing of any one of the display characters. One line P27 of the second input/output port is connected directly to the microphone 16, for use in recognizing the dial tone, to assist the user in determining, during a user-originated call, if there is a dial tone, ringing or busy signal on the line. A capacitance 44 is connected to the reset R input 40b. A resistance 46 is connected between the oscillator terminals $X_1$ and $X_2$, to allow proper clocking of the microcomputer with the externally-provided clock signal available through capacitance 39, connected to clock terminal $X_1$.

A "review" feature, allowing review of a stored message of a predetermined number (e.g. 48) of characters, is provided by connection of a timer T1 input 40c to operating potential V through a resistance element 48, with a push-to-close push button 50 being connected between input 40c and ground potential to enable the review feature.

The display driving means 55 receives the sequence logic and message formating means (microcomputer) output 40d signals for driving a suitable display means 60, herein comprised of a pair of 8-digit displays 60a and 60b, of the liquid crystal display type. The particular displays chosen each have 8 digits of the 16-bar type. Each of display driving means 50a–50d is an integrated circuit, such as the ICM7233 display driving integrated circuit available from INTERSIL, and the like. Each display driving means is provided with operating potential by connection to the +V source (as are the filter, decoder and microprocessor integrated circuits 30, 35 and 40, respectively). A display voltage line 55x is provided with the required voltage thereon by means of a transistor $Q_1$, having its collector electrode connected to the positive operating potential +V and its emitter electrode connected to line 55x. The emitter electrode is also connected through a resistance element 62 to ground potential, while the base electrode is connected to the wiper arm of a potentiometer 64, connected between collector and emitter of the device to provide for varying the contrast of the displays. Advantageously, the 8-digit liquid crystal displays 60a and 60b are type B728Y, available from Epson Co., and the like.

Figure 3A:
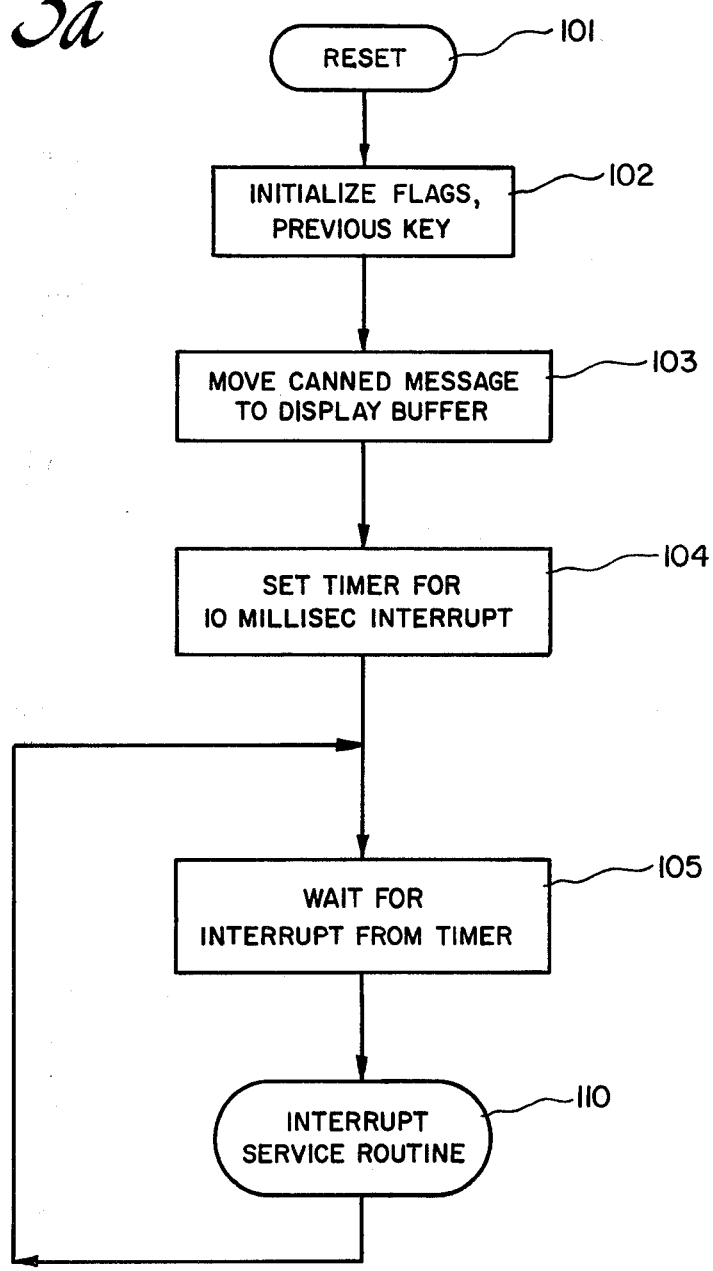
FIGS. 3a-3c form a flow chart illustrating the programming of the microprocessor utilized in the present invention.
Figure 3B:
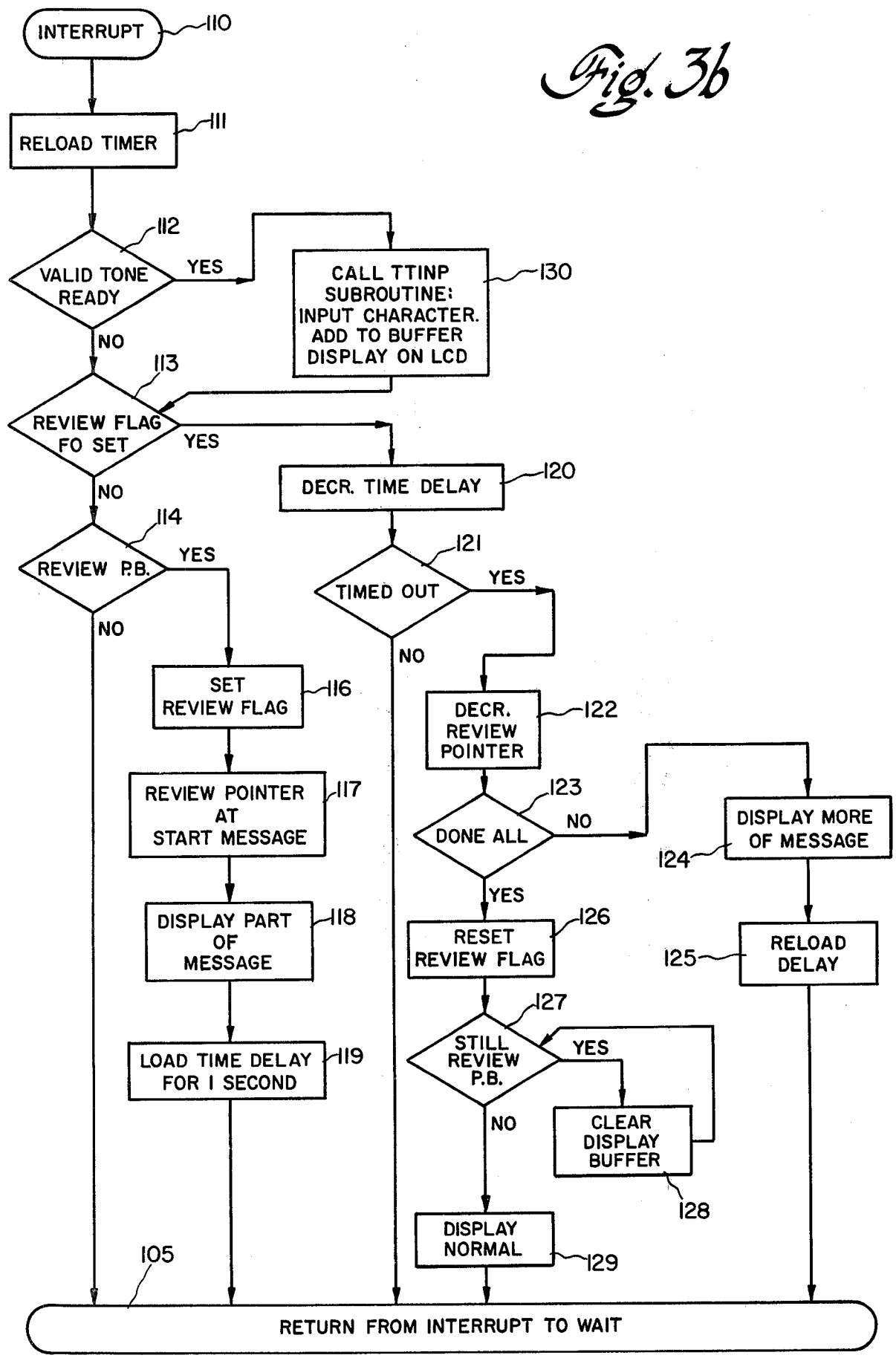
Figure 3C:
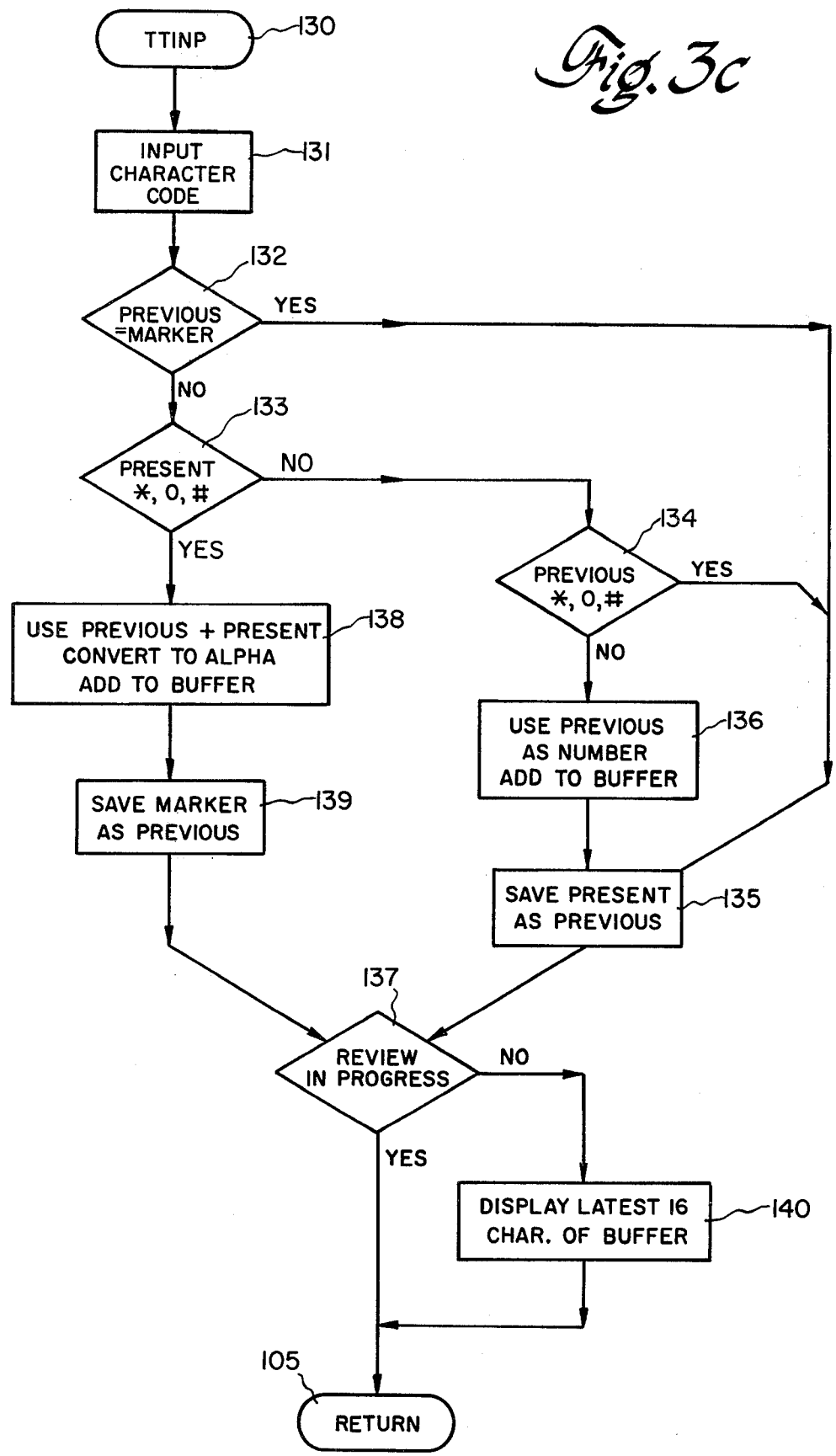

Referring now to all the Figures, and particularly to the flow chart of FIGS. 3a–3c, the internal read-only-memory (ROM) of microcomputer 40 is pre-programmed such that, upon application of power with push button 50 open, the microcomputer is reset at step 101 (FIG. 3a). Reset causes the microcomputer to initialize its flag register and previous key tones registers (including a 48-character received message buffer) formed in the 64 bytes of internal random-access RAM memory of microcomputer 40. After initializing the previous-key register and the flags register in step 102, step 103 is entered and a "canned" message (previously permanently stored in the ROM) is sent to the display buffer of the microcomputer, and thence to display driving means 55 for display of this predetermined message on display means 60. While step 103 is not essential to operation of the communications device 14, step 103 is utilized so that the user is provided with a check message upon power turn-on, allowing the user to determine if communications device 14 is properly operational, prior to reception of an externally-provided message. The communications device then moves to step 104, wherein the internal timer of microcomputer 40 is set to provide interrupts every 10 milliseconds, which interrupt time interval determines the basic time interval required to execute the stored "interrupt" service routine of steps 105 and 110. Thus, in step 105, the microcomputer waits for an interrupt from the timer (which interrupt occurs 100 times per second) and then goes through the interrupt service routine 110 (FIG. 3b) before returning to step 105 and waiting for the next interrupt to again begin the interrupt service routine 110.

The interrupt service routine 110 begins with the issuance of an interrupt from the microcomputer timing register. The timer is reloaded, in step 111, to enable the next subsequent interrupt to be made available, after 10 milliseconds. In the time interval between the successive interrupts, the remainder of the program of FIGS. 3b and 3c is run. The microprocessor checks the interrupt $\overline{\text{INT}}$ input 40a to determine if a valid tone STD signal is available at decoder output 35e (step 112). If a valid tone is not being received from the telephone instrument, step 112 exists to step 113, wherein the status of flag bit F0 is reviewed. If the F0 flag is not set, step 114 is entered and the status of the review push button 50 is checked. If the push button is not closed, no action is required responsive to the interrupt and that branch of the program returns to the interrupt wait step 105. Conversely, if, in step 114, the review push button had been closed, step 114 exits to step 116, wherein the review flag F0, of the flag register, is set. The stack pointer for the review sequence is set at the message start address, in step 117, and the first 16 characters, of the 48 message characters stored in the random access memory buffer (forming at least a part of an entire message), are displayed in step 118. The length of time during which the first N (where N is the number of characters of the particular display means 60) characters is "initially displayed" is set to a predetermined interval, e.g. 1 second, in step 119. Having set this delay, the program returns to step 105 and awaits the next interrupt. Thereafter, step 110 is re-entered and steps 111 and 112 acted upon, in the above-described manner. If a valid tone input is not received, step 113 is again entered and, as the review flag F0 bit is set (from previous step 116), step 120 is now entered. The time delay is decremented (e.g. to 0.25 seconds) and then checked, in step 121, to ascertain if that reduced delay (the "scrolling" delay) has timed out. If the scrolling delay has not timed out, step 121 exits back to step 105 and awaits the next interrupt which will bring the sequence back to step 121 (via steps 110–113 and 120) in a few microseconds. If the scrolling delay is now timed out, step 122 is entered and the review stack pointer is decremented, to bring out the data for the next (e.g. seventeenth) character of the review message. The stack pointer number is now checked against the number of review message characters, in step 123. As the present stack pointer number (e.g. 17) is less than the maximum number (e.g. 48) of review characters, step 123 exits to step 124. In step 124, the new review-message character associated with the new stack pointer address (set in step 122) is added to the display register and appears at the right end of the display (the left-most character disappears and all intermediate characters advance one display space to the left, i.e. the display is scrolled to the left). The delay timer is reloaded in step 125 with a value (e.g. 0.25 seconds) so that 4 new characters per second are scrolled onto the display, responsive to jumpers 42 being present from P15 and P17 to ground. The program returns through step 105 and awaits a next interrupt.

A subsequent interrupt will eventually cause step 113 to again go through steps 120–125 and a next (e.g. 18th) character will scroll onto the right end of the display. In this fashion, the entire stored message will move in ticker-tape fashion across the display 60. The scroll delay and, therefore, the speed of display movement, from right to left, is controlled by the jumpers 42, from inputs P14–P17, to ground potential. After the ticker-tape message review is completed, i.e. the 48th character is displayed, step 123 exits to step 126. The review F0 flag is reset and the reset push button status is checked in step 127. If the push button is still pressed, step 128 erases the display buffer; if the push button is no longer pressed, the display is returned to normal in step 129, showing the last sixteen characters received over the telephone; the program then returns to step 105 and waits for the next timer interrupt.

The foregoing review message sequence is initiated and/or continued only if step 112 indicates that a valid tone is not ready. If a valid tone is being received, the STD output 35e provides an indication at microprocessor input 40a and step 112 exits to step 130, wherein a dual-tone input TTINP subroutine is called to: input the tone character information; add the same to the message buffer; and display the same on the display means. Thus, as diagrammed in FIG. 3c, the TTINP call subroutine step 130 is followed by a step 131 in which the microprocessor reads the four-bit code, at decoder output 35d, and on input/output port pins P10–P13, responsive to a valid tone signal at input 40a. The program then checks, in step 132, whether the immediately-previously-stored character was a "marker," i.e. a synthesized signal indicating that the previous character has been placed in storage. If the previous character was not a marker, step 133 is entered and it is ascertained as to whether or not the present character is one of the *, 0 or # characters. If both steps 132 and 133 indicate the absence of markers and *, 0 or # characters, then a sequence of two successive number keys has been received. Accordingly, step 134 is entered and the presence of a previous *, 0 or # character is checked for. If an *, 0 or # character had been immediately previously received, then it is known that the decoded tones have, in some manner, gotten out of sequence and that the presently received tone pair does not indicate a valid character. Therefore, a new character is not to be added to the display buffer and step 134 exits to step 135, wherein the present decoded information is saved as the previous, or first, of the key-stroke-pair inputs for determining a next non-numerical character. If on the other hand, step 134 finds that the previous character was not an *, 0 or # character (which is the usual case), step 136 is entered and the previous information is considered to be a numerical character and added to the message buffer. Thereafter, step 135 is again entered. Step 135 also readies the device for the next key stroke information to be received, and exits to step 137 (to be described hereinbelow).

If step 133 had found that one of the *, 0 or # symbols were present, step 138 is entered and the immediately-previous and present key stroke data are converted to an alphanumeric character and added to the message buffer. Thereafter, step 139 is entered and the marker (provided by the addition of a character to the buffer in step 138) is saved as a synchronization device to help interpret a two-key stroke alphanumeric sequence. Thereafter, step 137 is entered. In step 137 the status of the review F0 flag is checked to determine if a message review is in progress. If such review is in progress, this review may be somewhere in the middle of its 48-character scrolled readout and is to be completed before newly received characters are displayed; accordingly, step 137 returns to interrupt wait step 105. The new character has been added to the buffer in step 136 or 138 and will appear at the end of the review sequence. If a message review is not in progress, step 137 exits to step 138, and, having added a new character to the end of the buffer, the latest 16 characters of the message buffer are displayed upon display means 55. Thereafter, the program returns to interrupt wait step 105 and is ready for the next interrupt.

As previously mentioned, the connection of microphone 16 to input P27 is utilized for dial tone detection by the microprocessor. The microprocessor enters the dial tone detection mode if power to device 14 is turned on while the review push button 50 is closed. The microprocessor is utilized to software filter the 400 Hz. dial tone frequency with a 50 millisecond time constant. If the dial tone frequency is present, microprocessor 40 causes 16 "stars" to be displayed across display means 60. Cessation of the dial tone causes display means 60 to be blanked, whereby the user can distinguish between a dial tone (steady display of 16 stars), the ringing of the called phone (with a two-second dial tone/star display "on" and a four-second dial tone/star display "off" sequence) and reception of a busy signal (having alternate one-half second periods with the dial tone/stars "on" and "off"). The dial tone detection mode of operation is disabled, and the normal communications decoding function of device 14 is established, by momentarily turning the power off, and then turning the power back on without holding push button 50 closed, after the ringing characteristic ceases (indicative of a call recipient having answered the recipient's telephone).

While the present invention has been described with respect to a presently preferred embodiment thereof, many modifications and variations will become apparent to those skilled in the art. It is my intent, therefore, to be limited only by the scope of the appending claims and not by the specific details and instrumentalities described by way of example herein.

What is claimed is:

1. A device, required only at a receiving location, for visually presenting information communicated over a telephone connection as a sequence of dual-tone-matrix-frequency (DTMF) signals to a receiving telephone instrument at said receiving location, comprising:

transducer means receiving the DTMF audio tones from said receiving telephone instrument for converting said audio tones into electrical signals;

means for filtering each dual-tone electrical signal into concurrent high-frequency-group and low-frequency-group electrical tone signals;

decoding means for converting each combination of one of the high-frequency-group tone signals and one of the low-frequency-group tone signals to an associated digital signal;

microprocessor means, including means for storing a set of instructions and for providing at least one randomly-accessible storage register, for recognizing the digital signal as at least a portion of one of a set of display control and alphanumeric symbols with each set symbol being completely characterized by no more than two successively-received digital signals, for storing the alphanumeric symbol in said register, for modifying the sequence and presence of the alphanumeric symbols stored in said register responsive to said display control symbols and for outputting a plurality of sequential alphanumeric symbols, including at least the last-received alphanumeric symbol, upon recognition of the at lest one digital signal corresponding to said last-received symbol; and means receiving the microprocessor means symbol output for simultaneously displaying the plurality of sequential alphanumeric symbols successively including at least said last-received alphanumeric symbol as soon as recognized by the microprocessor means.

2. The device of claim 1, wherein said device further includes means coupled to said microprocessor means for enabling a review of another plurality, larger than, but including, the plurality of symbols then displayed, of sequentially stored last-previously-received alphanumeric symbols.

3. The device of claim 2, wherein the device is adapted to scroll the another plurality of alphanumeric symbols of the review message across said display means when said review means is activated.

4. The device of claim 3, further including means connected to said microprocessor means for establishing the speed at which symbols are scrolled across said display means when the review means is activated.

5. The device of claim 1, wherein said device is adapted to recognize the presence of a dial tone frequency at said transducer means and to display a unique plurality of identical symbols responsive to receipt thereof.

6. The device of claim 1, further including means for coupling the electrical signal from said transducer means for storage external to the device.

7. The device of claim 6, wherein the coupling means is adapted for display of electrical signals coupled to said device from storage external to the device.

8. The device of claim 1, wherein said microprocessor means is adapted to recognize a first subset of numeric information symbols responsive to receipt of a single DTMF signal and to recognize another subset of display control and alphanumeric character symbols responsive only to a successive pair of DTMF signals received at said transducer means.

9. The device of claim 8, wherein said first subset consists of the numerals between 1 and 9.

10. The device of claim 8, wherein said another subset includes the numeral 0.

11. The device of claim 10, wherein said another subset also includes the letters of the alphabet.

* * * * *